Oct. 30, 1951  C. W. BRYANT  2,573,638
ADJUSTABLE CAM
Filed Nov. 29, 1946  2 SHEETS—SHEET 1
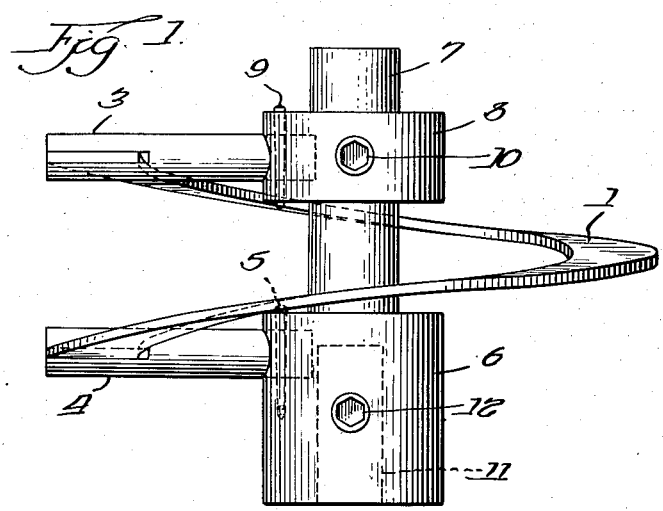
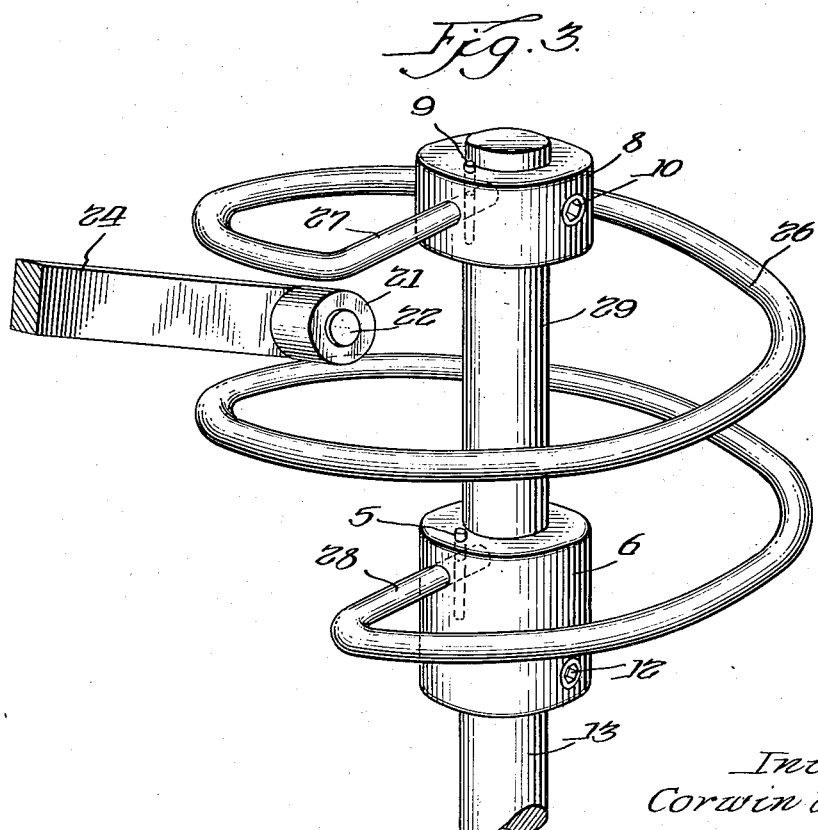
Inventor:
Corwin W. Bryant
By Joseph O. Lange
Atty.

Oct. 30, 1951     C. W. BRYANT     2,573,638
ADJUSTABLE CAM
Filed Nov. 29, 1946     2 SHEETS—SHEET 2
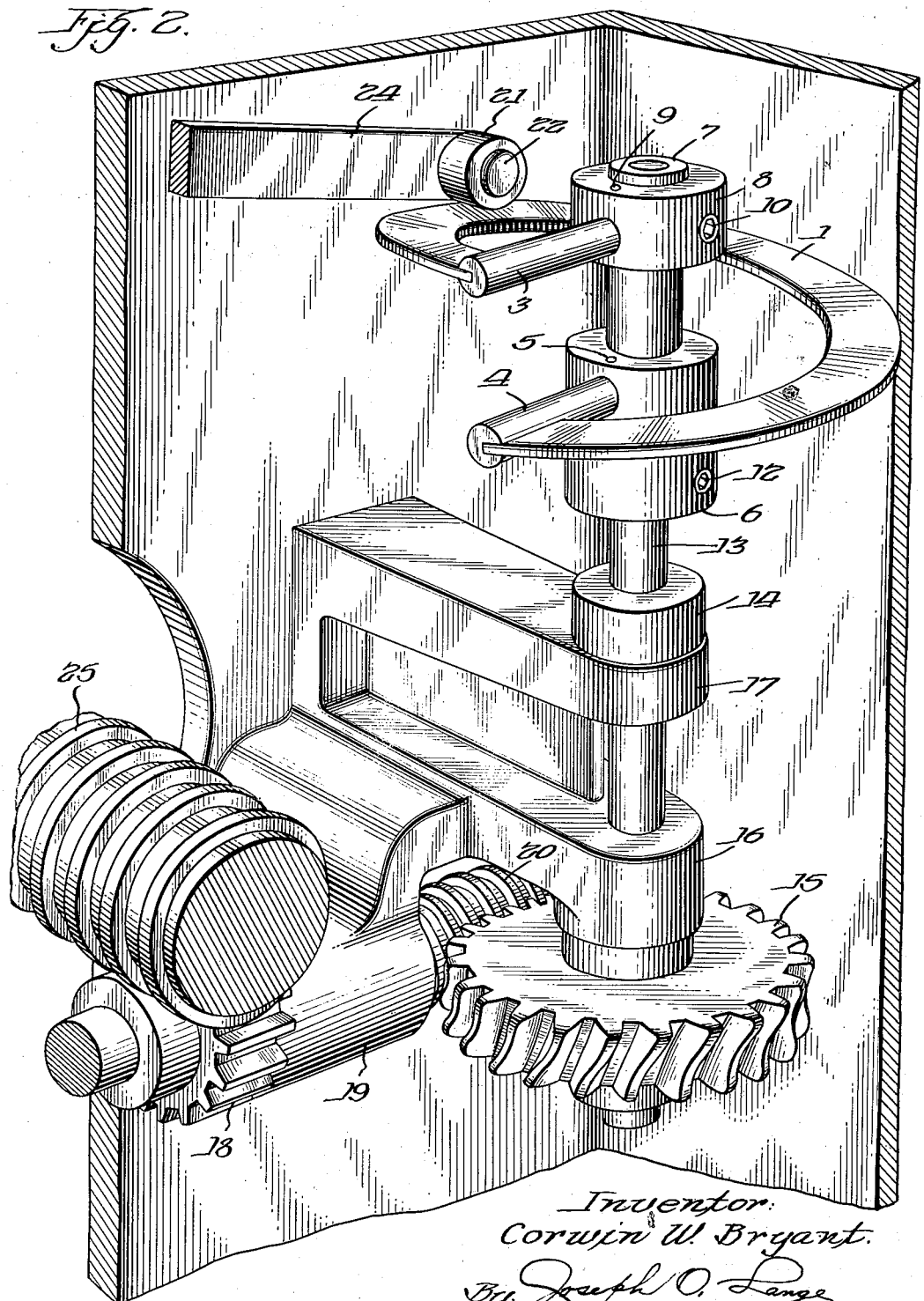

Patented Oct. 30, 1951

2,573,638

UNITED STATES PATENT OFFICE 2,573,638

ADJUSTABLE CAM

Corwin W. Bryant, Downers Grove, Ill., assignor to Crane Co., Chicago, Ill., a corporation of Illinois Application November 29, 1946, Serial No. 712,777

1 Claim. (Cl. 74—568)

This invention relates to a novel adjustable cam and more particularly my invention pertains to a simple actuating cam device featuring easy adjustability and is specially suitable for use on small machinery, instrument controls and the like where the load against a cam is either negligible or where it is considered as not being excessive.

Heretofore, on special geared equipment including operating indicating means, small cams have been individually made to suit the particular conditions encountered, which were expensive and frequently difficult in effecting proper adjustment.

An important object of this invention therefore is to provide a relatively economical single cam mechanism that can be conveniently adjusted to suit the various requirements arising in the normal course of use on equipment of the character above referred to.

A further advantage of this invention lies in the provision that the cam surface itself may be easily made from a single sheet of material and then fastened to its supporting and adjustable members to complete the adjustable cam assembly or unit.

Other advantages and objects of this invention will become more readily apparent upon proceeding with the following specification read in light of the accompanying drawings in which:

Fig. 1 is an exterior assembly view of the novel cam unit.

Fig. 2 is a perspective view illustrating a typical installation of the cam.

Fig. 3 is a view of a modified construction.

Similar reference characters refer to similar parts in the several views shown.

Referring now to the drawings, Fig. 1 shows an assembly view of the adjustable cam unit in which the cam surface or track 1 comprises essentially an annulus of resilient metal or plastic material which has been severed as illustrated. At the severed portions the two ends are affixed to the cam pin 3 and 4 preferably by brazing or other convenient means depending upon the ultimate service and the material of which the cam ring or annulus is constructed. The projecting cam pin 4, to which the lower end of the cam 1 is attached is fastened by means of a taper pin 5, shown in dotted lines, to the cam hub 6 which has an extended stem or neck 7 over which the upper cam hub collar 8 is fitted. The cam pin 3 is fastened by means of a taper pin 9 to the cam hub collar 8, the pin being shown in dotted lines. The cam hub collar 8 is provided with a set screw 10 which is used to lock the cam hub collar 8 in any desired rotative or axial position upon the extended neck 7 of the cam hub 6 thus providing a simple and convenient means of increasing or decreasing the pitch of the helix created by the cam plate 1.

The cam hub 6 is drilled at 11 (shown in dotted lines) so that it may be conveniently mounted over the shaft or shank (not shown) and subsequently be locked thereto by means of the set screw 12 or other similar means.

The foregoing description covers a preferred form of the adjustable cam assembly or unit. Fig. 2 shows a simple and practical application of the novel assembly. In the latter figure there is shown a conventional indicator mechanism which is generally used in conjunction with remote controlled and gear operated mechanisms for valves and the like of the type illustrated in the Crane Co. catalog No. 41 on page 172. Merely to illustrate one application, it should be explained that the cam 1 with its mounting pins 3 and 4 and the cam hub collar 8 together with the cam hub 6, is attached by means of the set screw 12 to the axle or shaft 13. The latter member in this case revolves approximately 270 degrees upon rotation of the gear 18 which is actuated by the valve stem or a similar threaded shaft 25 which is fragmentarily shown.

The shaft 13, to which the adjustable cam is fastened, is journally guided within the bearings 16 and 17 of the body or housing 19 by means of the bushing 14 at the upper outside end of the bearing and by the attachment of the spur gear 15 to the opposite or lower end of the shaft 13. The spur gear 15 is engaged in the conventional manner by the worm gear 20 which rotates on a shaft (not shown) and upon which the gear 18 is also mounted. The reciprocating movement of the threaded stem or shaft 25 effects a rack engagement with the gear 18 rotating the latter member. This motion is transmitted through the worm 20 and the spur gear 15 to the shaft 13 whereupon the adjustable cam 1 is caused to rotate. The longitudinal back and forth travel of the threaded stem or shaft 25 is thus reduced to the motion of rotation of the shaft 13 upon which the cam 1 is fixed to angular travel of less than 360 degrees.

Riding on the adjustable cam surface 1 is the follower roller 21, preferably fastened to the lever arm 24 by means of the pin 22. At this point, it should of course be understood that fastened to the lever arm 24 may be various devices and protruding arms or levers (not shown) useful for actuating switches, pressure indicating controls and the like, the amount of the actuating movement of which is governed by the transverse movement of the roller 21 on the lever arm 24. The latter result obviously depends upon the degree of rotation and pitch of the adjustable cam 1. It will thus be apparent that not only is the position of the effective cam surface conveniently regulated, but also the throw or axial movement of the roller 21 and transverse movement of the lever 24 in relation thereto.

Fig. 3 shows a modification of the above adjustable cam including a continuous strip of circular or polygonal cross-sectional material in the form simulating a coil spring 26, the advantage of this construction being that a greater transverse movement may be given to the lever arm 24 beyond that to which the single coil of material was limited as illustrated in Figs. 1 and 2.

It should be understood that the modified cam 26 may embody a plurality of coils, depending upon the desired travel of the lever being actuated and also upon the tensile properties of the material being used. In such cases the gear mechanism of Fig. 2 would be modified to allow more than the 270 degrees of revolution provided in the latter figure. The ends of the material may be suitably formed to provide the support pins 27 and 28, or these may be separate parts as numerals 3 and 4 in Fig. 1.

In considering its operation, the adjustable cam may be initially set, the latter setting being determined by the limits of the rotating mechanism to which the cam unit is attached for operation. A final setting of the adjustable cam will be made as determined by the limits of the follower or roller mechanism which rides on the cam surface. It should be understood that the apparatus to which the adjustable cam applies possesses a varying requirement for cam action. The adjustable cam provides a ready and convenient adjustment for the desired result.

Obviously the structural details of this invention may vary quite substantially from that shown and described. Therefore it is the desire that the scope of this invention be measured by the appended claim interpreted in light of the prior art.

I claim:

An adjustable cam of coiled-spring configuration, the combination of a coiled spring having spaced-apart hub members defining the respective end limits of the coiled spring, at least one of the hub members being provided with means for attachment to a shaft or the like, at least one of the hub members being adjustably movable axially and also rotatably relative to the other hub member thereby to vary the developed cam surface of the coiled spring, the coiled spring being composed of a material substantially flat or strip-like in cross-section, cam pin members extending substantially transversely from each hub member, the said cam pin members connecting the respective ends of the coiled spring to the said hub members.

CORWIN W. BRYANT.

REFERENCES CITED

The following references are of record in the file of this patent:

UNITED STATES PATENTS

| Number | Name | Date |
| --- | --- | --- |
| 511,269 | Holmes | Dec. 19, 1893 |
| 1,131,953 | Pilkington | Mar. 16, 1915 |
| 1,302,024 | Evenson | Apr. 29, 1919 |
| 1,436,072 | Allis | Nov. 21, 1922 |
| 1,492,266 | Ray | Apr. 29, 1924 |
| 1,722,535 | Oishei | July 30, 1929 |
| 2,117,806 | Holmes | May 17, 1938 |
| 2,387,149 | Hicks | Oct. 16, 1945 |
| 2,402,447 | Pritchard | June 18, 1946 |

FOREIGN PATENTS

| Number | Country | Date |
| --- | --- | --- |
| 523,312 | Germany | Apr. 2, 1931 |